(12) United States Patent
Talvensaari et al.

(10) Patent No.: US 10,422,020 B2
(45) Date of Patent: Sep. 24, 2019

(54) SCRAP MELTING IN ANODE FURNACE PROCESSES

(71) Applicant: OUTOTEC (FINLAND) OY, Espoo (FI)

(72) Inventors: Harri Talvensaari, Nummela (FI); Akusti Jaatinen, Espoo (FI)

(73) Assignee: OUTOTEC (FINLAND) OY, Espoo (FI)

( * ) Notice: Subject to any disclaimer, the term of this patent is extended or adjusted under 35 U.S.C. 154(b) by 0 days.

(21) Appl. No.: 15/567,180

(22) PCT Filed: Apr. 21, 2016

(86) PCT No.: PCT/FI2016/050262
§ 371 (c)(1),
(2) Date: Oct. 17, 2017

(87) PCT Pub. No.: WO2016/170233
PCT Pub. Date: Oct. 27, 2016

(65) Prior Publication Data
US 2018/0100216 A1    Apr. 12, 2018

(30) Foreign Application Priority Data

Apr. 23, 2015   (FI) ..................... 20155299

(51) Int. Cl.
*C22B 15/00*   (2006.01)
*C22B 9/05*    (2006.01)
(Continued)

(52) U.S. Cl.
CPC .......... *C22B 15/006* (2013.01); *C21C 5/4606* (2013.01); *C22B 9/05* (2013.01);
(Continued)

(58) Field of Classification Search
CPC ..... C22B 15/0056; C22B 15/006; C22B 9/05; C25C 5/04; C25C 3/34
See application file for complete search history.

(56) References Cited

U.S. PATENT DOCUMENTS

| 4,315,775 A | 2/1982 | Odle et al. |
| 4,444,586 A * | 4/1984 | Bienus ................ C22B 15/0036 266/214 |

(Continued)

FOREIGN PATENT DOCUMENTS

| CL | 199501276 | 6/1996 |
| CL | 42782 | 7/2006 |

(Continued)

OTHER PUBLICATIONS

"Blister copper." Merriam-Webster. https://www.merriam-webster.com/dictionary/blister%20copper. Downloaded Oct. 24, 2018. Originally saved Oct. 18, 2011 (Year: 2011).*

(Continued)

*Primary Examiner* — Tima M. McGuthry-Banks
(74) *Attorney, Agent, or Firm* — Buchanan, Ingersoll & Rooney PC

(57) ABSTRACT

Provided is a method for melting copper scrap and/or refining blister copper, comprising the steps of: (a) charging of copper scrap into an empty anode furnace and melting the copper scrap; (b) charging molten blister copper into the anode furnace; (c) optionally charging more copper scrap into the anode furnace and melting the copper scrap; (d) optionally repeating steps (b) and/or (c) one or more times until the anode furnace is full and a desired amount of copper scrap has been charged and melted until a final copper batch is obtained; and (e) refining the final copper batch to obtain anode copper.

8 Claims, 1 Drawing Sheet

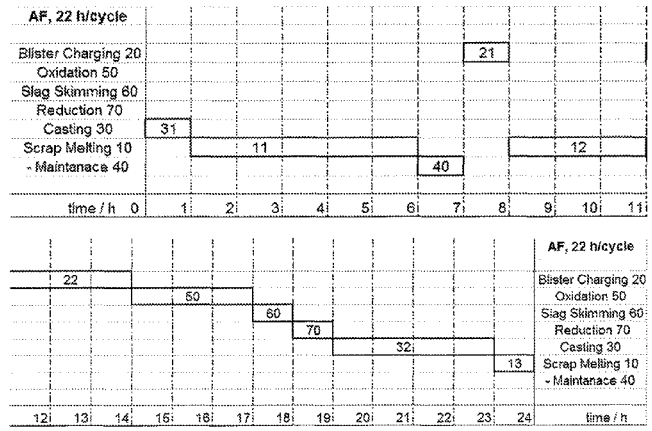

(51) Int. Cl.
*C22B 15/04* (2006.01)
*C21C 5/46* (2006.01)
*F23D 14/22* (2006.01)
*F23D 14/32* (2006.01)
*F23D 14/56* (2006.01)

(52) U.S. Cl.
CPC ...... *C22B 15/0036* (2013.01); *C22B 15/0056* (2013.01); *F23D 14/22* (2013.01); *F23D 14/32* (2013.01); *F23D 14/56* (2013.01); *Y02P 10/22* (2015.11)

(56) References Cited

U.S. PATENT DOCUMENTS

| | | | |
|---|---|---|---|
| 5,685,892 A | | 11/1997 | Ikoma et al. |
| 6,042,632 A | | 3/2000 | George |
| 6,478,847 B1 | * | 11/2002 | Jamison ............ C22B 15/0056 75/386 |
| 2012/0036963 A1 | | 2/2012 | George et al. |
| 2012/0175827 A1 | | 7/2012 | Deneys et al. |
| 2012/0326365 A1 | | 12/2012 | Properzi |

FOREIGN PATENT DOCUMENTS

| | | |
|---|---|---|
| CL | 52277 | 3/2016 |
| CN | 2859273 Y | 1/2007 |
| CN | 102812136 A | 12/2012 |
| WO | 96/06195 A1 | 2/1996 |
| WO | 99/15706 A1 | 4/1999 |
| WO | WO 99/15706 A1 | 4/1999 |
| WO | WO 2011/103132 A1 | 8/2011 |

OTHER PUBLICATIONS

Schlesinger, Mark E. and Matthew J. King, Kathryn C. Sole, William G. Davenport. Extractive Metallurgy of Copper. pp. 1-455. DOI: 10.1016/B978-0-08-096789-9.10001-0 (Year: 2011).*

International Search Report (PCT/ISA/210) dated Jun. 30, 2016, by the European Patent Office as the International Searching Authority for International Application No. PCT/FI2016/050262. (3 pages).

Written Opinion (PCT/ISA/237) dated Jun. 30, 2016, by the European Patent Office as the International Searching Authority for International Application No. PCT/FI2016/050262. (5 pages).

Notification of Transmittal of Translation of the International Preliminary Report on Patentability (PCT Rule 71.1) (Form PCT/IPEA/416) and International Preliminary Report on Patentability (PCT Article 36 and Rule 70) (Form PCT/IPEA/409) dated Mar. 16, 2017, in the corresponding International Application No. PCT/FI2016/050262. (10 pages).

Search Report issued by the Finnish Patent and Registration Office in corresponding Finnish Patent Application No. 20155299 dated Dec. 1, 2015 (2 pages).

The First Office Action issued by the China National Intellectual Property Administration in corresponding Chinese Patent Application No. 2016800224809 dated Dec. 13, 2018 (13 pages including partial English translation).

* cited by examiner

```
AF, 22 h/cycle

Blister Charging 20                                              21
Oxidation 50
Slag Skimming 60
Reduction 70
Casting 30        31
Scrap Melting 10         11                                              12
- Maintanace 40                                      40 time / h    0    1    2    3    4    5    6    7    8    9    10    11
```

```
                                                                    AF, 22 h/cycle
        22                                                          Blister Charging 20
                  50                                                Oxidation 50
                         60                                         Slag Skimming 60
                              70                                    Reduction 70
                                   32                               Casting 30
                                              13                    Scrap Melting 10
                                                                    - Maintanace 40

12   13   14   15   16   17   18   19   20   21   22   23   24     time / h
```

SCRAP MELTING IN ANODE FURNACE PROCESSES

FIELD OF THE INVENTION

The present invention relates to treatment of copper scrap, in particular to a method of melting copper scrap and/or refining blister copper in an anode furnace.

BACKGROUND OF THE INVENTION

Blister copper produced in converters or direct to blister furnaces is purified of sulfur and oxygen before it can be cast to anodes. This is done in anode furnaces (AF) in a process known as fire refining. In addition to refining blister copper to anode copper, the anode furnace may be used for melting solid copper such as copper scrap from the refinery and in-house anode copper scrap. However, conventional anode furnaces have very limited capacity to melt solid copper during operation. Thus typically copper scrap is melted in separate copper scrap furnaces.

WO2011/103132 discloses a method for anode refining of copper wherein molten blister copper is first provided to a furnace, then copper scrap is charged to the molten blister copper in the furnace, and finally charged copper scrap is melted and charged molten blister copper is heated using a melting flame produced from a top-blown multi-functional coherent jet lance. Multi-functional coherent jet lances require high pressure oxygen and high pressure nitrogen which are expensive to use and generally not easily available at a smelter. Also cooling water demand is high.

BRIEF DESCRIPTION OF THE INVENTION

An object of the present invention is thus to provide a method so as to alleviate the above disadvantages. The objects of the invention are achieved by a method which is characterized by what is stated in the independent claims. The preferred embodiments of the invention are disclosed in the dependent claims.

The invention is based on the realization that anode furnace waiting time may be utilized for melting of copper scrap as soon as casting of a previous batch has been finished. Melting of copper scrap in an empty anode furnace may be accomplished by using conventional pipe-in-a-pipe oxyfuel burner(s). Thus the method of the present invention can be realized by utilizing medium pressure oxygen and no nitrogen at all. Also cooling water demand is significantly smaller.

BRIEF DESCRIPTION OF THE DRAWINGS

In the following the invention will be described in greater detail by means of preferred embodiments with reference to the attached [accompanying] drawings, in which FIG. 1 is an example of a time lapse of operation of an anode furnace according to the method of the present invention.

DETAILED DESCRIPTION OF THE INVENTION

The present invention provides a method of melting copper scrap and/or refining blister copper, comprising the steps of:
(a) charging of copper scrap into an empty anode furnace and melting the copper scrap;
(b) charging molten blister copper into the anode furnace;
(c) optionally charging more copper scrap into the anode furnace and melting the copper scrap
(d) optionally repeating step(s) (b) and/or (c) one or more times until the anode furnace is full and a desired amount of copper scrap has been charged and melted until a final molten copper batch is obtained;
(e) refining the final molten copper batch to obtain anode copper.

Introduction of copper scrap into an empty anode furnace increases time available for melting and allows bigger scrap load and enhances operational flexibility. Further, improved copper scrap melting capacity enables the shutdown of existing on-site separate scrap melting furnaces or brings savings in capex costs when separate scrap melting furnace capacity is not required. The term "copper scrap" in particular refers to solid copper such as copper scrap from the refinery and in-house anode copper scrap.

The term "an empty anode furnace" refers to the state of an anode furnace after anode casting, i.e. after the previous refined molten copper batch has been poured from the anode furnace into anode molds. An empty anode furnace may therefore contain minor amount of molten copper remaining from casting of the same. The term "an empty anode furnace" thus in particular refers to the fact that no molten blister copper produced in converters and/or direct to blister furnaces is charged into the anode furnace after casting of the previous refined copper batch before a first copper scrap batch is charged into the anode furnace. Accordingly step (a) of the present method is performed directly after casting of the previous refined copper batch. However, required daily maintenance of the anode furnace can take place before or after first scrap charging and melting of the first copper scrap batch in step (a). The term "full" in context of anode furnace refers to the state of an anode furnace after completed charging copper scrap and molten blister copper i.e. to the fact that a desired degree of filling has been reached and desired amount of copper scrap and molten blister copper has been charged into the anode furnace.

FIG. 1 illustrates an example of a time lapse of operation of an anode furnace according to the method of the present invention. The example presents operational steps a single anode furnace (AF) during a 22 h operation cycle. The times indicated for each operation step and the operation cycle are exemplary and are not intended to restrict the scope of the example.

After casting (30) of the previous refined copper batch (31), a first lot of copper scrap (11) is first charged into an empty anode furnace (1) in multiple smaller batches (not shown). After the first lot of copper scrap (11) has been charged and melted (10), at least partially, a first lot of molten blister copper (21) is then tapped from a direct to blister furnace or a converter into the anode furnace (AF). A second lot of copper scrap (12) is then charged into the anode furnace (AF) in multiple smaller batches (not shown). After the second lot of copper scrap (12) has been introduced and melted (10), at least partially, a second lot of molten blister copper (22) is then tapped from a direct to blister furnace or a converter into the anode furnace (AF). If required more copper scrap and/or molten copper can be charged to obtain a final copper batch which is then subjected to any suitable fire refining method for refining the final copper batch i.e. typically oxidation (50), slag skimming (60) and reduction (70). The obtained refined copper batch, i.e. anode copper, is then cast (32). After casting (32) the next operation cycle can be started directly by charging of a first lot of copper scrap (13) of the next operation cycle.

Each of the charged copper scrap lots may be divided into multiple, i.e. two or more, batches which are charged consecutively. In this example the required daily maintenance (40) of the anode furnace takes place after first scrap melting (11).

For optimizing the time available for melting and for minimizing idle time of the anode furnace, charging of copper scrap is preferably initiated immediately after anode casting. This maximizes scrap melting time and improves operational flexibility. The term "immediately" indicates that required daily maintenance of the anode furnace takes place after melting of the first scrap batch.

Preferably melting of copper scrap is accomplished by providing additional heat energy to the anode furnace by using one or more conventional pipe-in-a-pipe type air-fuel, air/oxy-fuel or oxy-fuel burner(s) located at the furnace mantle, i.e. mantle burners. The use of the mantle burners can be combined with use of an end-wall burner for mixing combustion gases in the anode furnace thus leading to longer residence time for the hot gases and to enhanced melting efficiency in the anode furnace. The mantle burners may utilize air, oxygen enriched air or pure oxygen together with a solid, gaseous or liquid fuel, preferably pure oxygen together with a gaseous or liquid fuel. Mantle burners located at the furnace shell enable direct flame contact with copper scrap located at the bottom of the furnace and are not influenced by copper splashes.

It is possible to accomplish melting of copper scrap in step (a) partly simultaneously with charging of molten blister copper to the anode furnace in step (b).

With the method of the present invention at least 15 wt % of the total weight of the final copper batch may be copper scrap. Preferably at least 20 wt % of the total weight of the final molten copper batch is copper scrap. Accordingly all copper scrap corresponding to the total anode scrap formation in the smelter and electrolysis processes and/or returning from the electrolysis of the anode copper can be melted in the anode furnaces.

Typically at least 50 wt %, preferably from 60 to 100 wt %, of the weight of the total charged copper scrap in the final molten copper batch is charged in step (a). The amount of scrap charged and melted during anode furnace holding period is maximized to minimize furnace actual processing (oxidation/reduction) time as feeding of scrap is time consuming.

Copper scrap is advantageously charged into the empty anode furnaces typically in small, preferably 2 to 4 ton, batches. This allows faster melting of the copper scrap. These small batches sum up to a full, typically up to 35 ton, lot. A single charged lot of copper scrap is preferably divided into 5 to 15 batches.

Refining the final copper batch to obtain anode copper can be accomplished by any suitable fire refining method known to a skilled person. Typically fire refining is accomplished by a two stage process. In the first stage—oxidation—most of the sulfur is removed as $SO_2$ gas by injecting oxygen containing gas such as air into the molten copper bath. In the second stage—reduction—dissolved oxygen is removed by injecting reducing agent into the molten copper bath. Typically the reducing agent is hydrocarbon, such as natural gas or diesel, propane, hydrogen carbon monoxide, or ammonia.

It will be obvious to a person skilled in the art that, as the technology advances, the inventive concept can be implemented in various ways. The invention and its embodiments are not limited to the examples described above but may vary within the scope of the claims.

The invention claimed is:

1. A method of melting copper scrap and/or refining blister copper, comprising the steps of:
    (a) charging of copper scrap into an empty anode furnace and melting the copper scrap;
    (b) after performing step (a) charging molten blister copper into the anode furnace;
    (c) optionally charging more copper scrap into the anode furnace and melting the copper scrap;
    (d) optionally repeating steps (b) and/or (c) one or more times until the anode furnace is full and a desired amount of copper scrap has been charged and melted until a final molten copper batch is obtained which occurs at least after step (b);
    (e) refining the final molten copper batch to obtain anode copper;
    (f) emptying the anode furnace by pouring the anode copper from the anode furnace into anode molds to provide said empty anode furnace and repeating steps (a) to (f) after step (f).

2. The method as claimed in claim 1, wherein melting of copper scrap is accomplished by providing additional heat energy to the anode furnace by using one or more mantle burners selected from pipe-in-a-pipe air-fuel, air/oxy-fuel or oxy-fuel burner(s) located at a furnace mantle.

3. The method as claimed in claim 2, wherein the use of the one or more mantle burners is combined with use of an end-wall burner for mixing combustion gases in the anode furnace.

4. The method as claimed in claim 1, wherein at least 15 wt % of the total weight of the final copper batch is copper scrap.

5. The method as claimed in claim 1, wherein at least 50 wt % of the weight of the total charged copper scrap in the final molten copper batch is charged in step (a).

6. The method as claimed in claim 1, wherein the charging of copper scrap of step (a) is initiated immediately after anode casting.

7. The method as claimed in claim 1, wherein at least 20 wt % of the total weight of the final copper batch is copper scrap.

8. The method as claimed in claim 1, wherein from 60 to 100 wt % of the weight of the total charged copper scrap in the final molten copper batch is charged in step (a).

* * * * *